United States Patent [19]

Tomite et al.

[11] Patent Number: 4,564,776

[45] Date of Patent: Jan. 14, 1986

[54] MAGNETO DEVICE FOR GENERATING SIGNALS

[75] Inventors: Tosio Tomite, Katsuta; Nobuhiko Ogasawara, Mito; Kaniti Isii; Hisanobu Kanamaru, both of Katsuta, all of Japan

[73] Assignee: Hitachi, Ltd., Tokyo, Japan

[21] Appl. No.: 506,868

[22] Filed: Jun. 22, 1983

Related U.S. Application Data

[62] Division of Ser. No. 45,971, Jun. 6, 1979, Pat. No. 4,403,402.

[51] Int. Cl.[4] .............................. H02K 11/00
[52] U.S. Cl. ..................... 310/70 R; 310/42; 310/156; 310/218; 123/149 D
[58] Field of Search ............... 310/74, 42, 153, 70 R, 310/70 A, 156, 67, 218, 266, 91; 123/149 A, 149 D; 29/520, 598

[56] References Cited

U.S. PATENT DOCUMENTS

| | | | |
|---|---|---|---|
| 2,038,124 | 4/1936 | Osborne | 29/520 |
| 3,121,814 | 2/1964 | Kober | 310/156 |
| 3,527,266 | 9/1970 | Santi | 310/70 A |
| 3,559,946 | 2/1971 | Baxter | 29/520 |
| 4,249,298 | 2/1981 | Kanamaru | 29/520 |
| 4,305,198 | 12/1981 | Kanamaru | 29/520 |
| 4,327,302 | 4/1982 | Hershberger | 310/156 |
| 4,335,496 | 6/1982 | Kanamaru | 29/520 |

FOREIGN PATENT DOCUMENTS 142459 7/1951 Australia ............... 123/149 D

*Primary Examiner*—R. Skudy
*Attorney, Agent, or Firm*—Antonelli, Terry & Wands

[57] ABSTRACT

A magneto device for generating signals comprises a rotor including a permanent magnet and a pole piece which are secured to a rotary body, and a stator including a stationary pole piece and a signal output coil. Formed in the outer periphery of the rotary body is a recess in which the permanent magnet and the pole piece are inserted in this order. A cylindrical key member made of a non-magnetic metal is inserted in an annular space between the wall of the recess and the permanent magnet and pole piece. The key member is plastically deformed by pressing to secure the permanent magnet and pole piece to the rotary body.

7 Claims, 19 Drawing Figures

MAGNETO DEVICE FOR GENERATING SIGNALS

This is a division of application Ser. No. 45,971, filed 6/6/79, now U.S. Pat. No. 4,403,402.

This invention relates to a magneto device for generating signals, and more particularly to a magneto device suitable for generating ignition timing controlling signals of igniters for use with internal combustion engines.

In a known magneto device of this type, a permanent magnet is disposed on the outer periphery of a rotary body and fixed thereto by being covered with an annular supporter.

In the conventional construction, however, poor work ability in positioning and fixing the permanent magnet is encountered. Also, since the outer circumferential surface of the permanent magnet is covered with the supporter which is made of a steel plate, skirts of the magnetic flux acting on the signal output coil trail gradually, in a sine waveform, and hence the output voltage waveform used as the ignition signal rises gradually, thereby not to generate magnetic flux waveforms of high performance.

It is also known from U.S. Pat. No. 3,527,266 to use wedge-shaped members for fixing a permanent magnet and a pole piece to a flywheel of an ignition device. Also, in an electromagnetically operated force motor as disclosed in U.S. Pat. No. 3,559,946, a bonding member is inserted between two members for fixing them.

An object of this invention is to provide a magneto device for generating signals which is, from the mechanical point of view, stable and compact and which, from the electrical point of view, can generate magnetic flux waveforms of high performance.

In accordance with advantageous features of the present invention, a permanent magnet and a pole piece are inserted in a recess formed in a rotary body at a position where the permanent magnet and pole piece are to be held, and a cylindrical key member, made of a non-magnetic metal, is press fitted in a space between the inner wall of the recess and the permanent magnet and pole piece for firmly fixing the permanent magnet and pole piece to the rotary body.

The present invention will be apparent from the following detailed description taken in conjunction with the accompanying drawings, in which.

Figure 1:
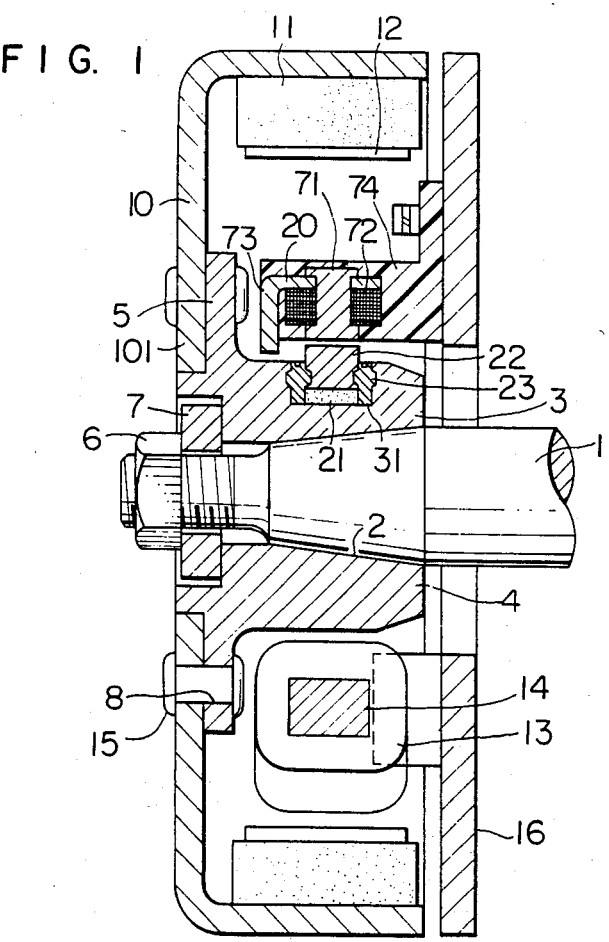
FIG. 1 is a longitudinal sectional view showing the main part of a power supply magneto generator provided with a magneto device for generating signals embodying the invention.

Referring to FIG. 1, there is shown in longitudinal section a power supply magneto generator for use with an internal combustion engine not shown. As shown in FIG. 1, an internal combustion engine driving shaft 1 has a tapered end portion 2, and a boss 3, made of a soft steel, has a cylinder 4 and a flange 5 which are formed integrally by cold forging or the like, the tapered end portion 2 being fitted in the cylinder 4. A nut 6 is screwed on the end of the driving shaft 1 to urge the cylinder 4 against the tapered end portion 2 through a washer 7. The flange 5 is formed with bores 8 for receiving rivets 15. On the inner periphery of a flywheel yoke 10, formed by shaping a soft steel plate, permanent magnets 11 and pole pieces 12 are disposed circumferentially and alternately in concentric relationship with the driving shaft 1. The inner surface of the pole piece 12 faces a stationary core 14 wound with a generator coil 13 through an air gap. A disk 101 of the flywheel yoke 10 and the flange 5 of boss 3 are coupled together by means of the rivets 15. The stationary core 14 is fixed by means of a screw to a generator base plate 16 which is fixed to an engine casing (not shown).

Figure 2:
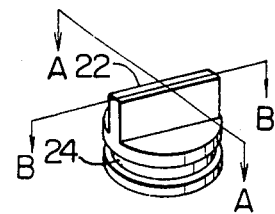
FIG. 2 is a perspective view of a pole piece provided for a rotor of the magneto device shown in FIG. 1.
Figure 3:
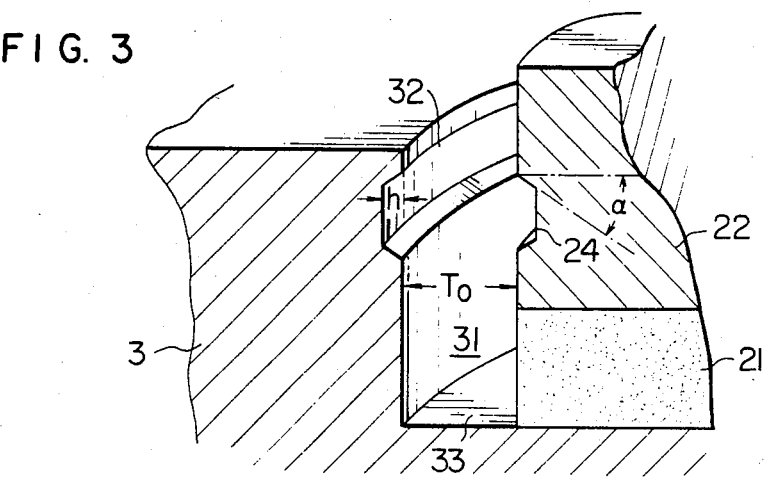
FIG. 3 is a partial longitudinal sectional view showing the positional relationship between a recess formed in a boss and the pole piece in the magneto device of FIG. 1.

A magneto device 20 for generating signals has a rotor including a pole piece assembly comprised of a permanent magnet 21 and a pole piece block 22 which are firmly and snugly held in a recess 31 in the boss 3 by means of a key member 23. The recess 31 in the boss 3 is formed with an annular groove 32 as best illustrated in FIG. 3. The pole piece block 22 has a configuration as shown in FIG. 2 and is formed with an annular groove 24 in its outer periphery.

The magneto device 20 also has a stator including a stationary pole piece 71, a signal output coil 72 and a second pole piece 73 which are encapsulated with a resin mold 74 fixed to the generator base plate 16.

A closed magnetic circuit is established through the permanent magnet 21, pole piece 22, air gap, stationary pole piece 71, stationary second pole piece 73, and boss 3. As the boss 3 rotates, the pole piece 22 passes by the stationary pole piece 71, inducing an output signal in the signal output coil 72. If it is desired to generate the output signal twice or more per one revolution of the boss, 3 obviously, two or more pole pieces 22 are disposed circumferentially as desired.

The following construction is provided for the boss 3 for firmly mounting thereto the pole piece assembly.

The diameter of the recess 31 in the boss 3 and the outer diameters of the pole piece 22 and permanent magnet 21 are so selected as to leave an annular space 33 having a width $T_o$ when the pole piece 22 and permanent magnet 21 are inserted in the recess 31 concentrically therewith as shown in FIG. 3. With the key member 23 made of copper, for example, the width $T_o$ is about 2 mm. Where one groove is provided for each of the pole piece 22 and the boss 3, the grooves 24 and 32 are preferably designed to have a depth h of 0.1 to 1.0 mm. If the depth h is too small, insufficient shearing stress results whereas if the depth h is too large, unnecessarily large pressures are required for inserting the key member 23. Also, the grooves 24 and 32 are preferably designed to have an inclination angle α of 25° to 70°. If desired, a plurality of grooves may be provided for the pole piece 22 and the boss 3. In this case, the depth h of the grooves 24 and 32 is preferably designed to be shallow as will be described later.

Figure 4:
FIGS. 4 and 5 are perspective views showing a key member according to the invention.
Figure 5:
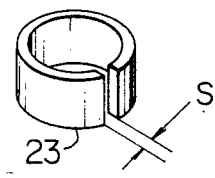

A non-magnetic metal material such as copper or aluminum is cut or shaped into a cylindrical configuration to form the key member 23 (FIGS. 4 and 5).

Figure 6:
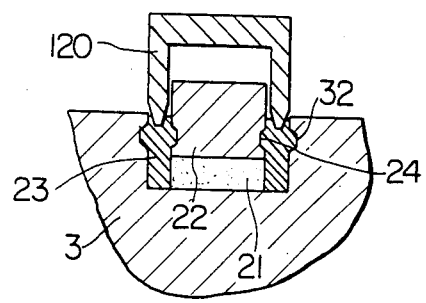
FIG. 6 is a partial longitudinal sectional view showing the manner of keying according to the invention.
Figure 7:
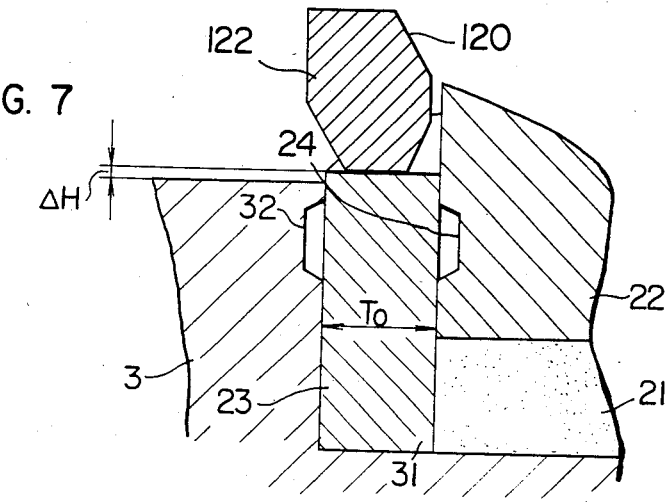
FIGS. 7 and 8 are diagrams useful to explain the keying step and keyed state according to the invention.
Figure 8:
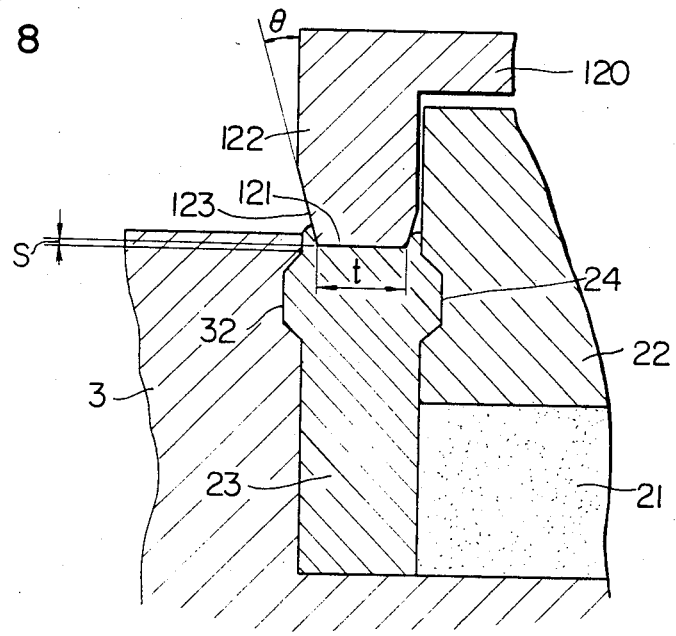

When mounting the permanent magnet 21, pole piece block 22 and key member 23 to the boss 3, the key member 23 is first inserted in the recess 31 and the permanent magnet 21 and pole piece block 22 are then inserted therein, as shown in FIG. 7. Thereafter, as shown in FIGS. 6 and 8, a metal mold 120 having a working surface 121 of a width t which is less than the width $T_o$ of the space 33 and working legs 122 is pressed against the key member 23 so that the key member 23 is plastically deformed and drawn in part into the grooves 24 and 32. In a state shown in FIG. 7, the key member 23 is surrounded with the boss 3, permanent magnet 21 and pole piece 22 except for the top surface facing the working legs 122 of the metal mold 120, and a differential height ΔH is considerably small. Accordingly, it can be said that the key member 23 as a whole is enclosed within the members to be keyed and the metal mold 120 immediately prior to pressing. Therefore, as shown in FIG. 8, the key member 23 can hardly escape from the space in the course of pressing.

An outer surface 123 of working leg 122 of the metal mold 120 is inclined θ with respect to a direction (inserting direction) perpendicular to the working surface 121, as shown in FIG. 8. The angle θ is preferably 6° to 15°. If the angle θ is too small, it is difficult to draw out the metal mold 120 after keying, whereas, if and angle θ is too large, not only the key member 23 tends to be drawn in a direction opposite to the inserting direction of the metal mold, 120 that is, to escape from the space but also the metal mold 120 cannot be inserted to a necessary depth, thus failing to generate a large internal stress in the key member 23 and a consequent large keying force.

It is desirable for the working leg 122 to be inserted deeply to ensure that, as shown in FIG. 8, a distance S between the working surface 121 and the upper edge of the grooves 23 and 32 is minimized as much as possible. In other words, the working surface 121 is as close as possible to the grooves 24 and 32. Experimentally, $0 \leq S/T_o \leq \frac{3}{4}$ is desirable. This dimension minimizes frictional loss which occurs when the key member 23 is plastically deformed and therefore permits sufficient insertion of the key member 23 into the grooves 24 and 32. If the working surface 121 were inserted more deeply than the upper edges of the grooves 24 and 32, an air gap would be formed between the key member 23 and both the grooves 24 and 32, resulting in poor keying forces.

In order to make the above construction workable, the material for the boss 3 and pole piece 22 is required to have larger stiffness and rigidity than the material for the key member 23. That is to say, the key member 23 is required to be more sensitive to deformation than the boss 3 and pole piece 22.

When inserted in the space 33 and pressed, the key member 23 is subject to a radial urging force, and the grooves 24 and 32, on the other hand, impart the key member 23 with an outward, axial shearing stress so that the key member 23 can firmly be keyed in the grooves 24 and 32 and is partly drawn into the annular grooves 24 and 32 to secure the pole assembly to the rotary body 32.

As described above, the mounting construction according to the invention is simple but sufficient to accurately position the members to be mounted, minimizing the outer diameter of the rotor mounted with those members. In addition, the members used for mounting are easy to produce and time and steps necessary for fabrication can be reduced.

A shearing intensity test showed that the key member 23 made of aluminum had a static strength of 13 to 20 kg/mm$^2$. Mechanical strength is of the most important matter in the magneto generator and it is necessary for the magneto generator to be sufficiently resistive to mechanical shocks due to centrifugal force and angular acceleration. While any conventional devices are mechanically unreliable because they suffer from unreliability and thermal deterioration of adhesives or bonder and ineffective clamping for possible gaps, the present invention dispenses with adhesives and inhibits any gaps from taking place, ensuring the highly reliable mounting construction.

The pole piece block 22 is of a two-story rectangle in specified diametral section taken on line A—A in FIG. 2, the upper rectangle being smaller than the lower rectangle, and is mounted to the boss 3 in such a manner that the two-story rectanglar section lies in the rotating direction. Electrically, this configuration and disposition of the pole piece block 22 permits rapid rise of wave form of the magnetic flux interferring with the signal output coil 72 and consequent generation of a voltage waveform which is suitable for use as the ignition signal.

Figure 9A:
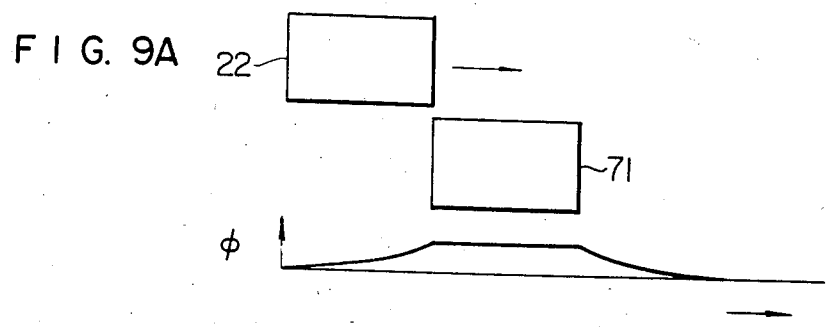
FIGS. 9A to 9D are wave-form diagrams useful to explain generation of ignition signals.
Figure 9B:
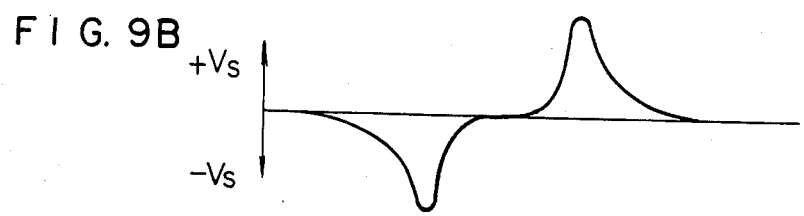
Figure 9C:
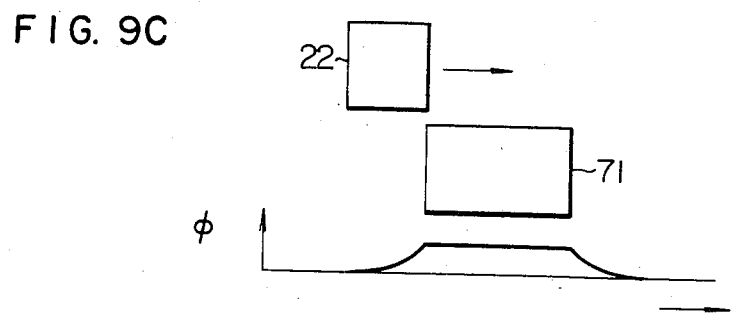
Figure 9D:
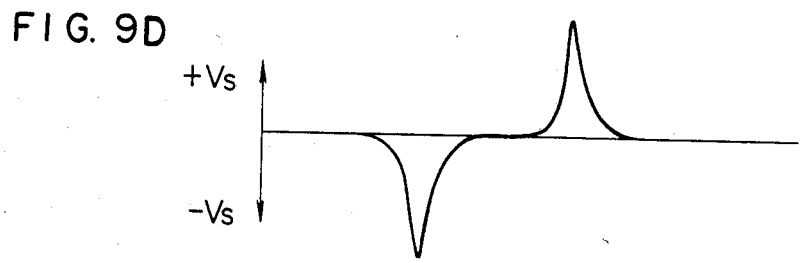

More particularly, if the pole piece 22 is a column and is of a rectangle in diametral section, as in the section on line B—B, magnetic flux φ will change, as shown in FIG. 9A, as the boss rotates and an output signal $V_s$ as shown in FIG. 9B will result. Contrary to this, with the pole piece 22 being, in diametral section, of the two-story rectangle and laid such that the width of its upper portion, which is shorter than the diameter, for example, half the diameter, lies in the rotating direction, magnetic flux φ changes as shown in FIG. 9C and a sharp output signal $V_s$ as shown in FIG. 9D results. The upper portion of pole piece 22 may be figured in section into other configurations than a rectangle such as a triangle in accordance with characteristics as desired.

The non-magnetic key member 23 advantageously reduces radial leakage flux from the permanent magnet to the boss.

Figure 10:
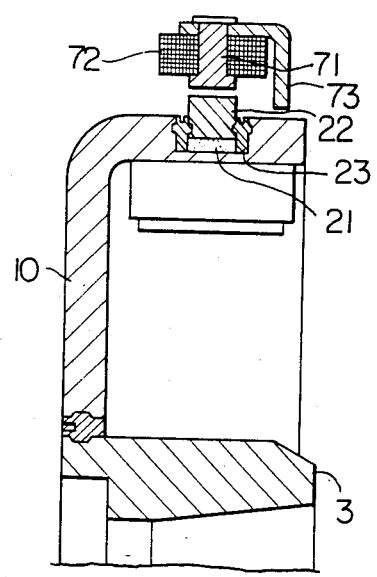
FIG. 10 is a partial longitudinal sectional view of another embodiment of the invention.

FIG. 10 shows another embodiment wherein a pole piece 22 is mounted to the outer periphery of a flywheel yoke 10. In this embodiment, a recess is formed in the outer periphery of the flywheel yoke 10. A permanent magnet 21 and the pole piece 22 are inserted in the recess and firmly held therein by means of a key member 23. A stationary pole piece 71, a signal output coil 72 and a stationary pole piece 73 are disposed outwardly of the flywheel yoke 10.

Figure 11:
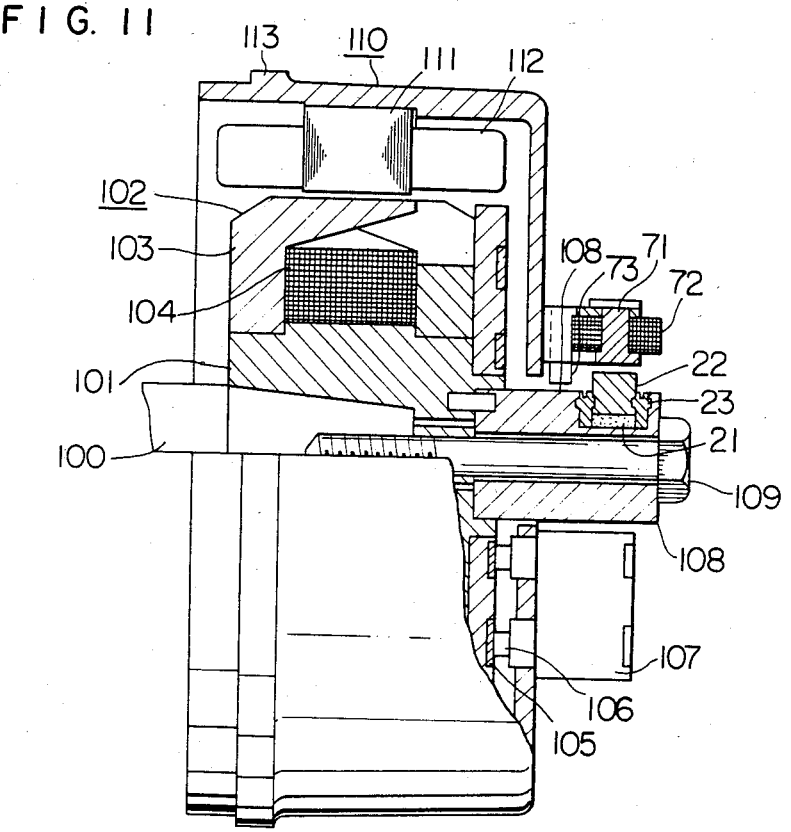
FIG. 11 is a partial longitudinal sectional view of still another embodiment of the invention.
Figure 12:
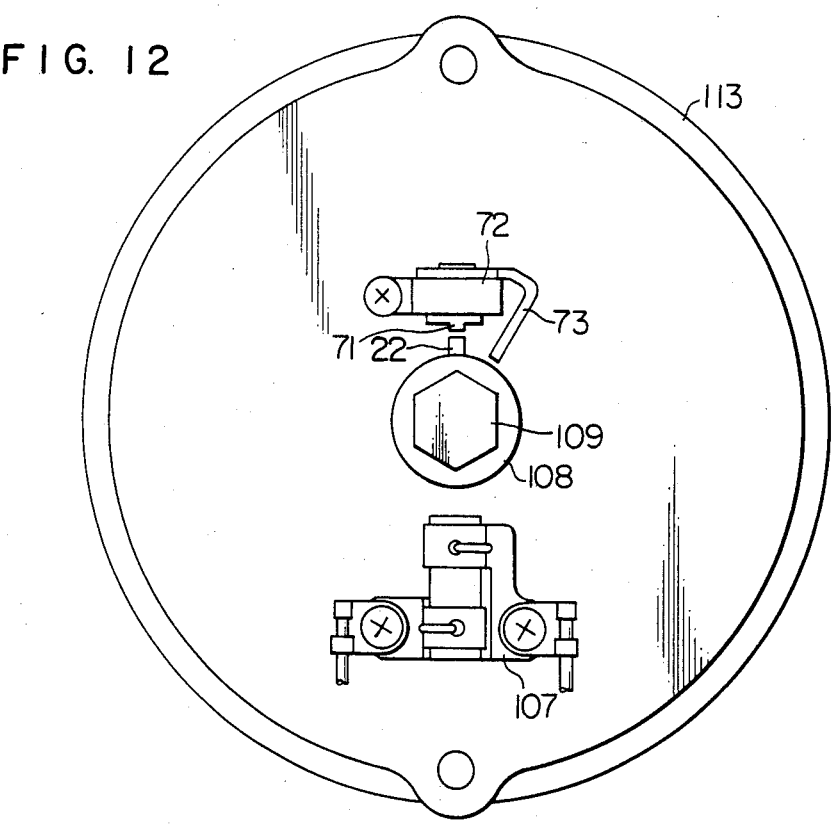
FIG. 12 is a front view of the embodiment of FIG. 11.

In further embodiment of the invention as shown in FIGS. 11 and 12, a magneto device for generating signals is mounted outside the casing of an AC generator. Secured to a crank shaft 100 is a boss 101 to which a rotor 102 is mounted. The rotor 102 includes a rotor core 103, a field coil 104 and slip rings 105. A stator 110, on the other hand, includes a laminated core 111, a generator coil 112, and a casing 113. Brushes 106 are supported by a brush box 107, making contact with the slip rings 105. A sleeve 108 is urged against the boss 101 by tightening a bolt 109 which is passed through the sleeve and screwed into the crank shaft 100. A magnet 21 and a pole piece 22 are firmly held in a recess in the sleeve 108 by means of a key ring 23. A stationary pole piece 71 is fixed to the casing 113 and a signal output coil 72 is wound on the pole piece 71. Reference numeral 73 designates a pole piece for establishing a closed magnetic circuit.

The magnet 21 and pole piece 22 firmly mounted to the sleeve 108 by means of the key ring 23 in this embodiment operate to perform the same effect as the previous embodiment.

Figure 13:
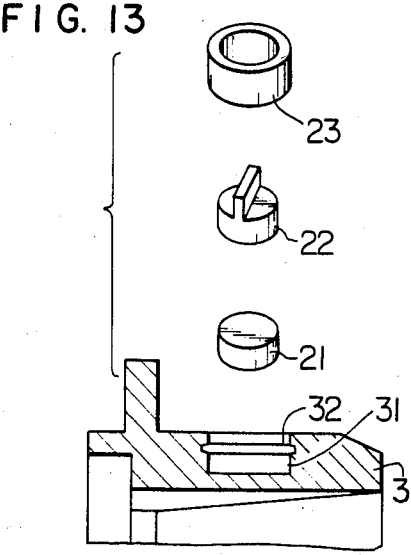
FIG. 13 is an exploded view showing further embodiment of the invention.

FIG. 13 shows further embodiment of the invention wherein a single groove 32 is provided for a recess 31 in a boss 3 and a pole piece 22 lacks a groove. This embodiment meets applications where the magnitude of centrifugal force and the like external forces is small and a relatively small key force suffices. Alternatively, a single groove may be provided for the pole piece 22.

Figure 14:
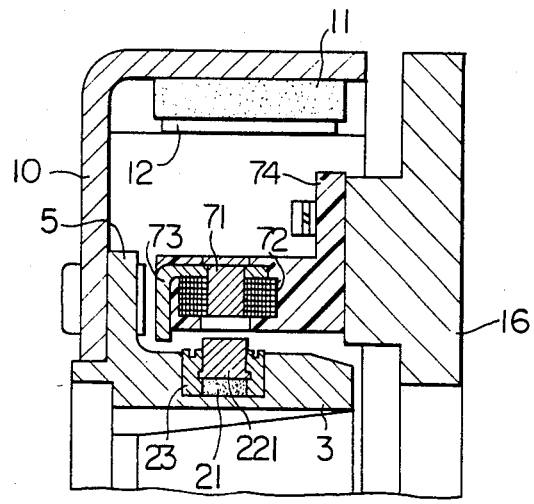
FIG. 14 is a partial longitudinal sectional view of further embodiment of the invention.
Figure 15:
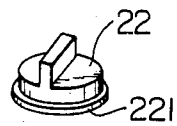
FIG. 15 is a perspective view of a key member used in the embodiment of FIG. 14.

In further embodiment as shown in FIGS. 14 and 15, a pole piece 22 is provided with a flange 221 in place of a groove.

Figure 16:
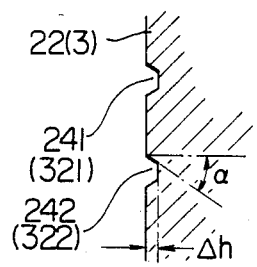
FIG. 16 is a partial enlarged sectional view showing a further embodiment of the invention.

FIG. 16 shows further embodiment wherein a plurality of grooves 241 (321) and 242(322) are provided for a pole piece 22 or a recess 31 in a boss 3. In this embodiment, the groove is preferably designed to have a depth $\Delta h$ of 0.03 to 0.15 mm and an inclination angle $\alpha$ of 25° to 70°.

The groove of such structural dimensions can be formed when forming the recess 31 by drilling or the pole piece 22 by cutting with a surface roughness of 25 to 100 S.

In the foregoing embodiments, the internal combustion engine or the power supply generator for vehicles was partly modified to incorporate the magneto device 20 for generating signals, but a separate or independent magneto device 20 for generating signals may be attached to the internal combustion engine or other rotary bodies without modifying them. The magneto apparatus may also be attached to auxiliary rotary machines.

The use of output signal of the magneto device 20 for generating signals is not limited to the ignition signal but may be applied to number of revolutions or rotation angle detecting signals.

As described above, in the magneto device 20 for generating signals according to the invention, signal generating members can be mounted more firmly and stably than in the conventional devices, and the mounting construction can be compact.

The rotary pole piece can be of a desired configuration to ensure that output signal waveforms meeting desired applications can be obtained.

What we claim is:

1. A magneto device for generating signals, the magneto device comprising a pole piece assembly secured to a soft steel rotary body and including a permanent magnet and a pole piece block, and a stationary signal output coil cooperative with said pole piece assembly, a recess formed in said rotary body at a position where said pole piece assembly is firmly held in said rotary body, said recess being dimensioned so as to accommodate said permanent magnet and pole piece block therein in this order while leaving an annular space between a wall of said recess and said permanent magnet and pole piece block, and a key means made of a non-magnetic metal keyed in said annular space by pressing for securing said pole piece assembly to said rotary body.

2. A magneto device for generating signals according to claim 1, wherein said pole piece block extends in a direction perpendicular to a direction coaxial with a rotary shaft upon which the rotary body is secured.

3. A magneto device for generating signals according to claim 1, wherein an annular groove is formed in an upper surface of said key means so as to secure said pole piece assembly to said rotary body.

4. A magneto device for generating signals, the magneto device comprising a pole piece assembly secured to a rotary body and including a permanent magnet at a pole piece block, and a stationary signal output coil cooperative with said pole piece assembly, a recess formed in said rotary body at a position where said pole piece assembly is firmly held in said rotary body, said recess being dimensioned so as to accommodate said permanent magnet and pole piece block therein in this order while leaving an annular space between a wall of said recess and said permanent magnet and pole piece block, and a key means made of a non-magnetic metal keyed in said annular space by pressing for securing said pole piece assembly to said rotary body, said pole piece block being a two-story rectangle in diametrial section.

5. A magneto device for generating signals according to claim 2, wherein annular grooves are formed in the walls of said recess formed in an outer periphery of said pole piece block, said key means being partly drawn into said annular grooves for securing said pole piece assembly to said rotary body by an axial shearing stress and a radial urging force generated in said key means.

6. A magneto device for generating signals according to claim 2, wherein an annular groove is formed in an upper surface of said key means so as to secure said pole piece assembly to said rotary body.

7. A magneto device for generating signals according to claim 2, wherein said pole piece block extends in a direction perpendicular to a direction coaxial with a rotary shaft upon which the rotary body is secured.

8. A magneto device for generating signals, the magneto device comprising a pole piece assembly secured to a rotary body and including a permanent magnet and a pole piece block, and a stationary signal output coil cooperative with said pole piece assembly, a recess formed in said rotary body at a position where said pole piece assembly is firmly held in said rotary body, said recess being dimensioned so as to accommodate said permanent magnet and pole piece block therein in this order while leaving an annular space between a wall of said recess and said permanent magnet and pole piece block, annular grooves formed in the walls of said recess formed in an outer periphery of said pole piece block, and a key means of a non-magnetic metal is keyed in said annular space and partly drawn into said annular grooves for securing said pole piece assembly to said rotary body by an axial shearing stress and a radial urging force generated in said key means.

* * * * *